(12) United States Patent
Trapp et al.

(10) Patent No.: US 12,116,430 B2
(45) Date of Patent: Oct. 15, 2024

(54) RECYCLE DILUENT CONTROL AND OPTIMIZATION FOR SLURRY LOOP POLYETHYLENE REACTORS

(71) Applicant: ExxonMobil Chemical Patents Inc., Baytown, TX (US)

(72) Inventors: Keith W. Trapp, Kingwood, TX (US); John L. Begue, Port Allen, TX (US); Kelly M. Forcht, Louisville, KY (US); Douglas J. Picou, Baton Rouge, LA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 582 days.

(21) Appl. No.: 17/425,910

(22) PCT Filed: Jan. 23, 2020

(86) PCT No.: PCT/US2020/014806
§ 371 (c)(1),
(2) Date: Jul. 26, 2021

(87) PCT Pub. No.: WO2020/163093
PCT Pub. Date: Aug. 13, 2020

(65) Prior Publication Data
US 2022/0195076 A1    Jun. 23, 2022

Related U.S. Application Data

(60) Provisional application No. 62/801,485, filed on Feb. 5, 2019.

(51) Int. Cl.
*C08F 2/01*     (2006.01)
*B01J 4/00*     (2006.01)
*B01J 19/00*    (2006.01)

(52) U.S. Cl.
CPC ............... *C08F 2/01* (2013.01); *B01J 4/008* (2013.01); *B01J 19/0006* (2013.01); *B01J 19/0053* (2013.01); *B01J 2219/00164* (2013.01); *B01J 2219/00182* (2013.01)

(58) Field of Classification Search
USPC .......................................... 526/59; 700/269
See application file for complete search history.

(56) References Cited

U.S. PATENT DOCUMENTS

| | | |
|---|---|---|
| 2010/0317812 A1 | 12/2010 | Towles |
| 2012/0283395 A1* | 11/2012 | Hendrickson ............ B01J 8/224 422/111 |
| 2014/0171601 A1 | 6/2014 | Bhandarkar et al. |

FOREIGN PATENT DOCUMENTS

EP        0432555        6/1991

* cited by examiner

*Primary Examiner* — Fred M Teskin
(74) *Attorney, Agent, or Firm* — ExxonMobil Technology and Engineering Company (57) ABSTRACT

A method for regulating use of stored diluent in a polymerization process so as to maximize use of diluent recycled diluent recovered from the process, and so minimize use of stored diluent, is disclosed. Also disclosed is apparatus, particularly as an arrangement of controllers and valves for handling the flow of diluent through the process that can be used to implement the disclosed process.

19 Claims, 6 Drawing Sheets

RECYCLE DILUENT CONTROL AND OPTIMIZATION FOR SLURRY LOOP POLYETHYLENE REACTORS

CROSS-REFERENCE OF RELATED APPLICATIONS

This application is a National Phase Application claiming priority to PCT Application Serial No. PCT/US2020/014806, filed Jan. 23, 2020, which claims the benefit of U.S. Provisional Application Ser. No. 62/801,485, filed Feb. 5, 2019 and entitled "Recycle Diluent Control and Optimization for Slurry Loop Polyethylene Reactors," the disclosures of which are hereby incorporated by reference in their entireties.

FIELD OF THE INVENTION

The present disclosure relates to apparatus and methods for controlling and optimizing diluent flow, and especially usage of diluent from a storage facility, into a polymerization reactor.

BACKGROUND

In many polymerization processes for the production of polymer, a slurry of particulate polymer solids is suspended in a liquid medium, ordinarily comprising a reaction diluent and unreacted monomers. A typical example of such processes is disclosed in Hogan and Bank's U.S. Pat. No. 2,825,721, the entire disclosure of which is incorporated herein by reference. While the polymerization processes described in the Hogan document employs a catalyst comprising chromium oxide and a support, the present invention is applicable to any process comprising a slurry of particulate polymer solids suspended in a liquid medium comprising a diluent and unreacted monomer. Such reaction processes include those which have come to be known in the art as particle form polymerizations.

Furthermore, for polymerization processes in which the polymerization effluent slurry is flashed in a first stage flash to vaporize a fraction of the liquid medium to produce concentrated polymer effluent and vaporized liquid, then in a second stage flash to remove the remaining liquid medium, diluent is recovered from the liquid medium from both the first flash and the second flash for reuse in the polymerization process. The cost of reusing diluent from the second stage flash is higher than the cost of diluent from the first stage flash due to compression, distillation, storage, and treatment of the second stage flash product. The cost of the polymerization process can be reduced by utilizing as much of the recovered first stage flash product diluent as possible.

SUMMARY

In one aspect, a method for regulating stored diluent utilization by a polymerization reactor is disclosed. Such a method can include steps of:
i) determining a desired total amount of diluent flow into the polymerization reactor T;
ii) measuring a total diluent flow T into the polymerization reactor, T being the sum of a recycle diluent flow R and a flow S of stored diluent from a storage facility, the flow R being controlled by a recycle flow valve D and the flow S being controlled by a diluent feed valve B;
iii) reading the actual position of the valve B and comparing the actual valve position with a pre-set position of valve B, and controlling the valves D and B in a manner that, if the valve B is open less than the pre-set position, closing the valve D and opening the valve B to provide the minimum stored diluent flow S to provide the flow T, and if the valve B is open more than the pre-set position, opening the valve D and closing the valve B to reduce the flow S to that required to provide the flow T.

Another aspect of the present disclosure is an apparatus for regulating stored diluent utilization by a polymerization reactor system. Such an apparatus can be one comprising:
i) a polymerization reactor system including:
  i-1) a polymerization reactor configured for performing a polymerization reaction in a slurry;
  i-2) a slurry separation system configured for separating polymer product from diluent in the slurry and recovering polymer product separately from diluent;
  i-3) a diluent recycling facility that includes a recycle accumulator configured to accumulate diluent for recycling and to return accumulated diluent to the polymerization reactor as a recycle diluent flow R via a diluent recycle valve D, or to send accumulated diluent to a storage facility via a spillover valve G; and
  i-4) a facility for storing and delivering fresh diluent to the polymerization reactor via a stored diluent flow S through a diluent feed valve B;
ii) one or more controllers configured to, in operation, store a desired Weight % Solids (W%S) or Volume % Solids (V%S) in the polymerization reactor, to determine whether, in operation, a flow of diluent into the polymerization reactor T is necessary to maintain the desired W%S or V%S, to measure an actual total diluent flow T into the reactor, as a sum of the recycle diluent flow R and the stored diluent flow S, to store a pre-set position of the valve B, to read the actual position of the valve B, to compare the actual position of the valve B with the pre-set position, and to operate the valves B and D in a manner that, if in operation of the apparatus the position of the valve B is open less than the pre-set position, the valve D is closed and the valve B is opened to provide the minimum stored diluent flow S to provide the total diluent flow T necessary to maintain the desired W%S or V%S (as may be applicable), and if the position of the valve B is open more than the pre-set position, the valve D is opened and the valve B is closed to reduce the flow S to that required to provide the desired total diluent flow T to maintain the desired W%S or V%S (as may be applicable).

BRIEF DESCRIPTION OF THE DRAWINGS

The following figures are provided as an aid to understanding the present disclosure. The figures are illustrative only and should not be understood to limit the scope of the invention, which is defined by the appended claims.

DETAILED DESCRIPTION

In some polymerization processes a polymerization effluent slurry (generally comprising polymer product, diluent, catalyst and unreacted monomer) is flashed in a first stage flash to vaporize a fraction of the liquid medium to produce concentrated polymer effluent and vaporized liquid, then in a second stage flash to remove the remaining liquid medium. In such processes, diluent can be recovered from the liquid medium from both the first flash and the second flash for reuse in the polymerization process. The cost of reusing diluent from the second stage flash is higher than the cost of diluent from the first stage flash due at least to compression, distillation, storage, and treatment of the second stage flash product.

In the present disclosure, for systems that include flash systems and recycle for recovery of diluent, the total diluent flow rate to the polymerization process T is composed of stored diluent flow S from the compression, distillation, treatment and storage system, together with direct diluent recycle flow R from at least a first flash stage (which can be the first flash stage of a system that includes two or more flash stages). The stored diluent can also include "fresh" diluent obtained from a source other than the polymerization system and that has not previously been input to the polymerization system.

The total desired diluent flow rate to the polymerization process T depends upon various operating conditions. Slurry density is lowered by higher diluent flows and increased by lower flows. Higher rates of monomer feeds generally require higher diluent flows, and lower monomer feed rates generally require lower diluent flows. Increasing catalyst feed rate can require higher diluent flow, and lowering catalyst feed rate can require lower diluent flow. Increased production rate requires more diluent flow, and lower production rate requires lower diluent flow. The polymerization process operating conditions of startup, shutdown, and steady state operation also require changes in the desired diluent flow rate.

Total diluent flow can also be adjusted to assist with upset polymerization process conditions. Upsets in the slurry circulation rate, and upsets in slurry circulation pump performance, can be improved by increased diluent flow. An upset resulting in undesirably high process temperatures can be regulated by increasing diluent flow rate.

In general, the response to a polymerization process upset to return the system to normal performance is to reduce the rate of monomer feed and increase the total diluent flow rate.

In the presently disclosed method, the usage of diluent collected from a first stage accumulator is adjusted with the aim of minimizing usage of the higher cost stored diluent regardless of the amount of the desired total diluent flow rate, or the method by which the desired diluent flow rate is determined. Also disclosed are apparatus that are configured to implement such adjustment.

The particular manner in which use of stored diluent is regulated by the presently disclosed method and the particular arrangement(s) of valves and the working of their control programming in implementation of the disclosed method using the apparatus disclosed herein provide an improvement in operation of a polymerization reactor, especially in the operation of a polymerization reactor implementing a slurry-based polymerization. Such improvement of the polymerization process is found at least in that usage of stored diluent, either as fresh, previously unused diluent or as diluent recovered from the process and treated to separate the liquid diluent from catalyst, catalyst poisons, and polymer product, and the like, is minimized. This minimization of stored diluent substantially lowers the cost of the polymerization process overall.

Polymerization Reactor Systems

In a polymerization system, generally the polymer product will be separated from the liquid medium comprising an inert diluent and unreacted monomers in such a manner that the liquid medium is not exposed to contamination so that the liquid medium can be recycled to the polymerization zone with minimal if any purification. A particularly favored technique that has been used up to now is that disclosed in the Scoggin et al, U.S. Pat. No. 3,152,872, more particularly the embodiment illustrated in conjunction with FIG. 2 of that patent. In such processes the reaction diluent, dissolved monomers, and catalyst are circulated in a loop reactor in which the pressure of the polymerization reaction is relatively high. The produced solid polymer is also circulated in the reactor. A slurry of polymer and the liquid medium is collected in one or more settling legs of the slurry loop reactor from which the slurry is periodically discharged to a flash chamber wherein the mixture is flashed to a comparatively low pressure. The flashing results in substantially complete removal of the liquid medium from the polymer, and the vaporized polymerization diluent (e.g., isobutane) is then recompressed in order to condense the recovered diluent to a liquid form suitable for recycling as liquid diluent to the polymerization zone. The cost of compression equipment and the utilities required for its operation often amounts to a significant portion of the expense involved in producing polymer.

U.S. Pat. No. 6,204,344, hereby incorporated by reference in its entirety, describes an embodiment of a polymerization system that includes a two-stage flash system for diluent recovery and recycling and associated methods for diluent recovery and recycling. U.S. Pat. No. 6,204,344 discloses, inter alia, an apparatus for continuously recovering polymer solids from a polymerization effluent comprising a slurry of said polymer solids in a liquid medium comprising an inert diluent and unreacted monomers. The apparatus comprises a discharge valve on a slurry reactor, examples of which include slurry loop reactors and stirred tank slurry reactors, for the continuous discharge of a portion of the slurry reactor contents into a first flash tank. The first flash tank operates at a pressure and slurry temperature such that a substantial portion of the liquid medium will be vaporized and the inert diluent component of said vapor is condensable, without compression, by heat exchange with a fluid. The first flash tank is in fluid communication with a second flash tank via a pressure seal that allows plug flow of a concentrated slurry into a second flash tank that operates at a temperature of the concentrated polymer solids/slurry and pressure such that any remaining inert diluent and/or unreacted monomer will be vaporized and removed overhead for condensation by compression and heat exchange and the polymer solids are discharged from the bottom of said second flash tank for additional processing or storage.

Some polymerization processes distill the liquefied diluent prior to recycling to the reactor. The purpose of distillation is removal of monomers and light-end contaminants. The distilled liquid diluent is then passed through a treater bed to remove catalyst poisons and then on to the reactor. The equipment and utilities costs for diluent distillation and treatment can be a significant portion of the cost of producing the polymer.

In a commercial scale operation, it is desirable to liquefy the diluent vapors at minimum cost. One such technique used heretofore is disclosed in Hanson and Sherk's U.S. Pat. No. 4,424,341 in which an intermediate pressure flash step removes a significant portion of the diluent at such a temperature and at such a pressure that this flashed portion of diluent may be liquefied by heat exchange instead of by a more costly compression procedure.

U.S. Pat. No. 6,818,186, hereby incorporated by reference in its entirety, also describes a polymerization system to which the present disclosure could usefully be applied.

A complete polymer production plant will include a number of components for handling solids, liquids and gases, such as but not limited to separator systems such as cyclones and accumulator drums; pumps; sensors or meters of flow, pressure, and/or temperature; and the like, that are not described in detail herein. Unless otherwise described herein, such components are considered to be known in the art.

Valves and Controllers

Valves and controllers that are useful in the presently disclosed methods and apparatus can be any that are known in the art that can be configured in the manner presently described, and are considered to be commercially available. Any one valve can be controlled by a "specific" controller that controls only that valve. Alternatively, a plurality of valves can be controlled by a single controller.

A controller that might be used is a PID feedback controller; i.e. one with proportional, integral and/or derivative modes or terms the algorithm for its control action. (As described, for instance in "Tuning and Control Loop Performance, $2^{nd}$ Ed., by Gregory K. McMillan (1990) at p. 3, the entire volume of which is hereby incorporated by reference for all purposes.) General principles of feedback control in a closed-loop system can be found in the Chemical Engineers' Handbook, $5^{th}$ Ed. by Robert H. Perry and Cecil H. Chilton (1973), e.g. Chapter 22 at p. 4, hereby incorporated by reference for all purposes.

Communication between valves and controllers, or between any two or more controllers, or among various sensors (e.g. a nuclear density meter) and meters and controllers disposed in or about an apparatus as disclosed herein can be via a wireless network or via a wired network. Design and implementation of a communication network among sensors, meters, controllers and valves are considered to be known in the art.

Control can be "direct", i.e. an instruction that has no condition precedent for its execution, or "hierarchical", i.e. including a set of preconditions that must be met before an instruction is executed. For example, a hierarchy can be set up such that a first controller can "override" a second controller to control a valve if a value of a parameter read by or pre-set in the first controller is exceeded.

Valves are controlled to open and close. Typically movements of valves are incremental, i.e. the valve is controlled to move only a small amount by any one signal from a controller. Moving valves incrementally promotes stability in the operation of the polymerization system, for example by avoiding sudden large pressure changes. It is contemplated, however, that large movements of one or more valves might be used under some reactor conditions or a particular reactor operation (e.g. startup or shutdown). In general, a valve will be moved, and the system will respond in some manner and time will be permitted to allow the full system response before the next controlled valve movement.

The amount that a valve is controlled to move in any one increment, or the frequency of signaling of movement increments, is not necessarily the same for every valve, or for opening and closing movements of a valve. These also may be variable for opening and closing movements of a valve depending upon the operating condition of the reactor. For example, the rate of opening and closing of a diluent recycle valve D (described below) is typically slow, but its closing rate can be fast in the instance when the position of a diluent feed valve B (also described below) is less than a setpoint.

Figure 1:
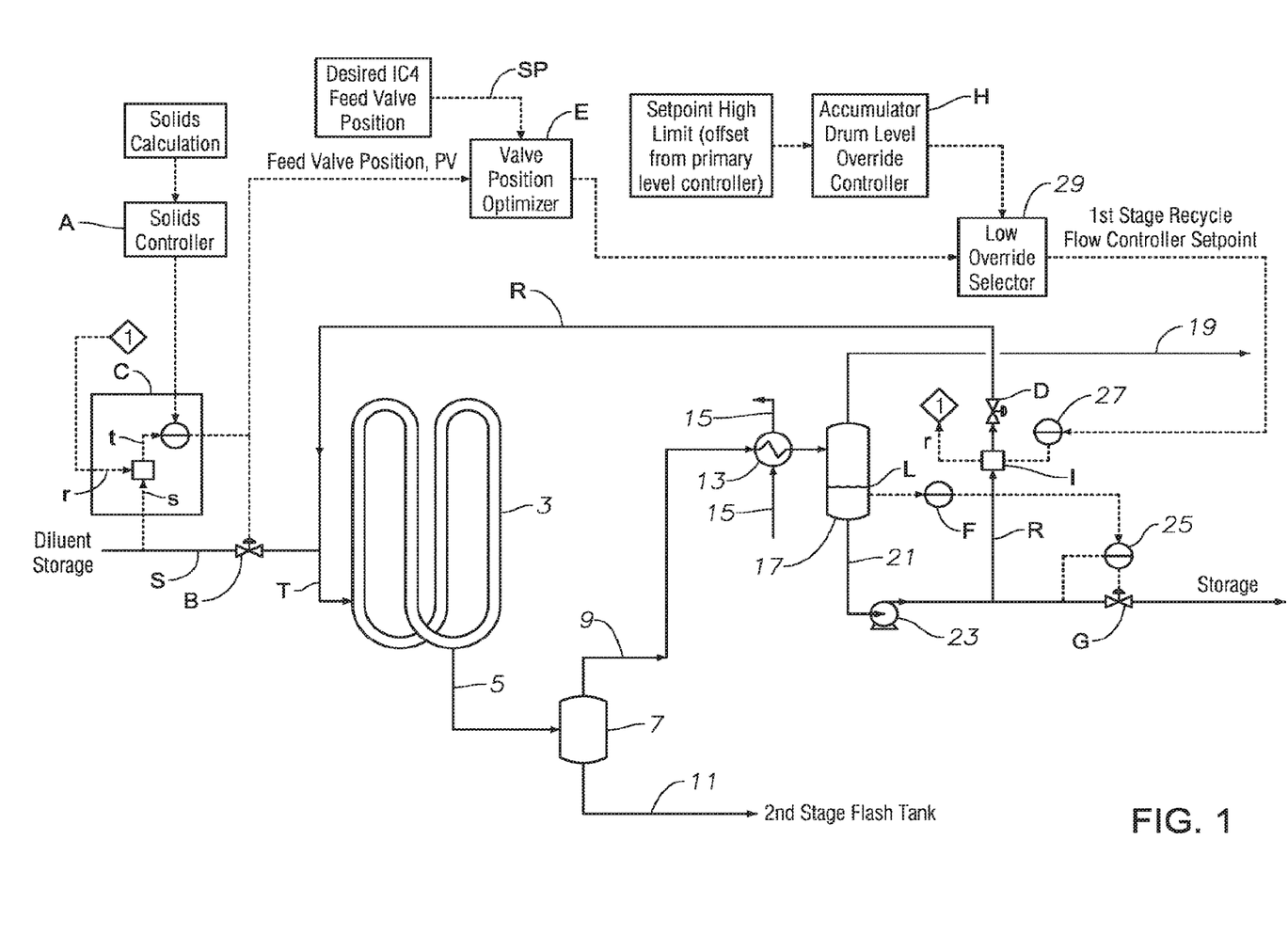
FIG. 1 presents a schematic of one embodiment of an apparatus as disclosed herein.

FIG. 1 illustrates one embodiment of an apparatus as disclosed herein. In FIG. 1, a solids controller A reads or stores a value of a desired amount of solids in the polymerization reactor 3. The value can be obtained as either a mass value or a volume value, as may be required for the particular controllers used in the apparatus.

If the following are defined:
$V_R$=Volume of the polymerization Reactor (constant)
$\rho_{LIQ}$=Density of Liquid phase (from known characteristics of the diluent and regression as known in the art)
$\rho_{POL}$=Density of Polymer (a constant for each polymer product)
$\rho_{SL}$=Density of Slurry (measured by e.g., a nuclear density meter)
$V_L$=Volume of the Liquid phase
$V_P$=Volume of the Polymer (including the volume of the catalyst)
Then, $$V_L = V_R - V_P$$

Volume % Solids=$V_P/V_R$

Mass of Polymer=$V_P \times \rho_{POL}$

Mass of Liquid=$V_L \times \rho_{LIQ}$

Mass of Slurry=$V_R \times \rho_{SL}$

Mass of Slurry=Mass of Polymer+Mass of Liquid $$(V_R \times \rho_{SL}) = (V_P \times \rho_{POL}) + (V_L \times \rho_{LIQ})$$

$$(V_R \times \rho_{SL}) = (V_P \times \rho_{POL}) + ((V_R - V_P) \times \rho_{LIQ})$$

$$(V_R \times \rho_{SL}) = (V_P \times \rho_{POL}) + (V_R \times \rho_{LIQ}) - (V_P \times \rho_{LIQ})$$

$$(V_R \times \rho_{SL}) - (V_R \times \rho_{LIQ}) = V_P \times \rho_{POL} - (V_P \times \rho_{LIQ})$$

$$V_R(\rho_{SL} - \rho_{LIQ}) = V_P(\rho_{POL} - \rho_{LIQ})$$

$$V_P = V_R(\rho_{SL} - \rho_{LIQ})/(\rho_{POL} - \rho_{LIQ})$$

Volume % Solids($V\%S$)=$V_P/V_R$=$(\rho_{SL} - \rho_{LIQ})/(\rho_{POL} - \rho_{LIQ})$;

Also, Weight % Solids=$V_P \times \rho_{POL}/V_R \times \rho_{SL}$

Figure 2:
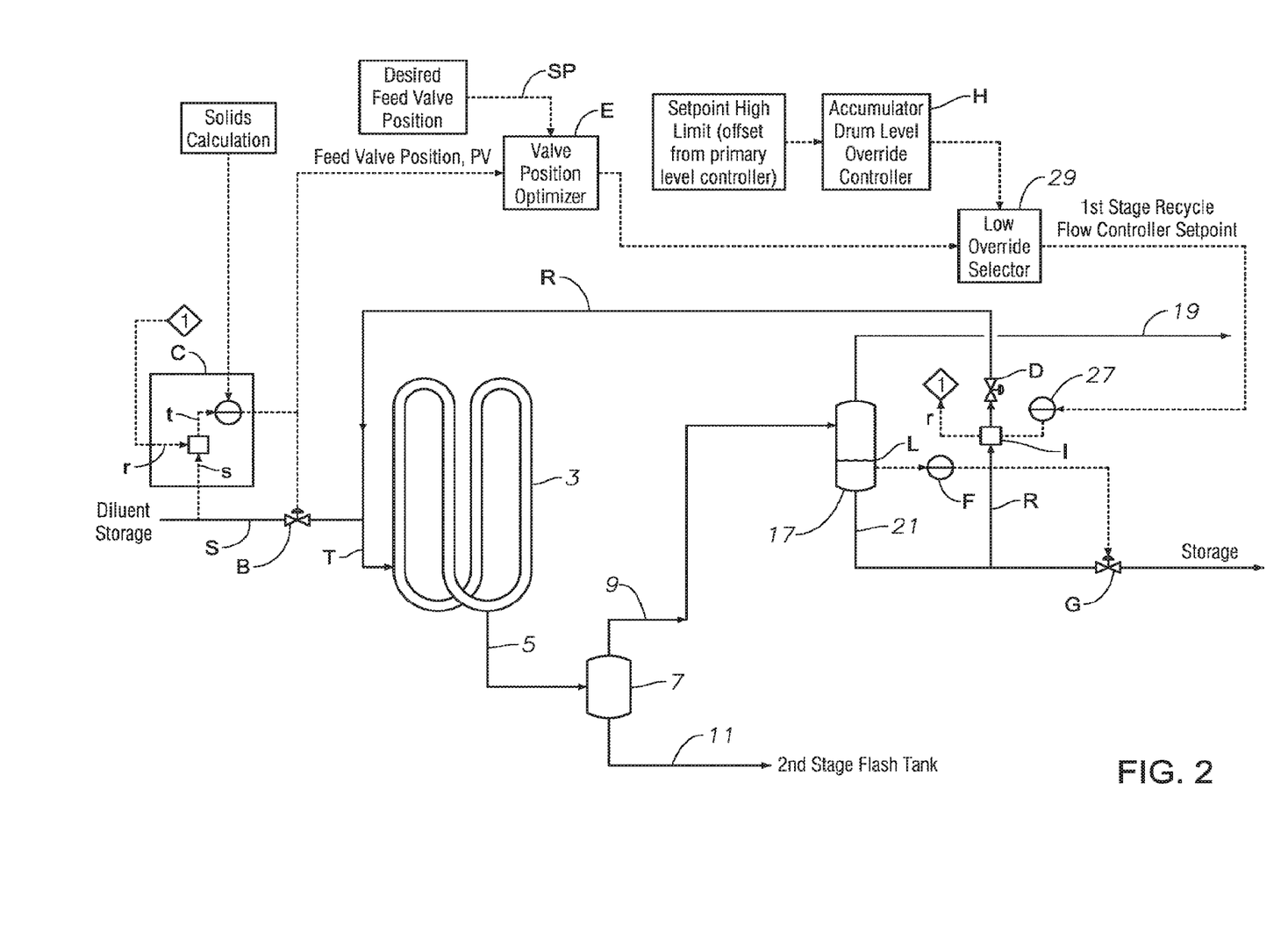
FIG. 2 presents a schematic of a second embodiment of an apparatus as disclosed herein.

Weight % Solids=$V_R((\rho_{SL} - \rho_{LIQ})/(\rho_{POL} - \rho_{LIQ})) \times \rho_{POL}/V_R \times \rho_{SL}$ Weight % Solids($W\%S$)=$\rho_{POL}(\rho_{SL} - \rho_{LIQ})/(\rho_{SL}(\rho_{POL} - \rho_{LIQ}))$ A flow T of diluent into the reactor maintains a given (target) W%S or V%S by replacing diluent exiting the reactor together with polymer removed from the reactor. The value of W%S or V%S is read by or stored in the controller A and the controller A then determines whether additional or less diluent is required in the reactor to maintain the given W%S of V%S. The controller A then signals a first flow controller C to increase, decrease or maintain the diluent flow into the polymerization reactor T. (In some embodiments, e.g. as illustrated in FIG. 2, A is omitted and the value W%S or V%S is stored in the flow controller C and the determination to adjust the flow of diluent is made in the flow controller C.) The flow of diluent into the polymerization reactor T is composed of a flow of stored diluent S and a flow of diluent recycled from a diluent recovery plant R. The stored diluent may be fresh diluent or can be recycled diluent that has been accumulated from one or more flash tanks after condensation and collection as a liquid in an accumulator. Stored diluent can include a mixture of both fresh and recycled diluent.

The flow controller C also reads the amount r of the first stage recycle flow R from flow meter 1 through a diluent recycle valve D. The flow controller C also reads the amount of a diluent flows through a diluent feed valve B that controls a stored diluent flow S of diluent, and also calculates t, the value of the needed flow T, as the sum r+s. Alternatively, the relationship of the flow S to the position of the valve B can be determined empirically, a process known in the art as "valve characterization", and the flow controller C can use the position of the valve B as the variable for the flow S.

The flow controller C also controls the diluent feed valve B to deliver the amount S, and so provide the amount T of diluent to the polymerization reactor 3 as the combined streams R and S.

A product stream 5, comprising the reaction slurry in turn comprising the diluent and the solids fraction that includes the polymer product and catalyst, is taken from the polymerization reactor to a slurry separation system for separating the polymer product from the diluent and recovering the diluent separately from the polymer product. In the embodiment illustrated in FIG. 1, the slurry separation system is a "two-stage flash system" and the product stream is introduced into a first stage flash tank 7. The first stage flash tank is operated under a condition that a substantial portion of the diluent is flashed and recovered as a vapor stream 9. A bottom stream 11, comprising the polymer product and other solids, now as a substantially more concentrated slurry, is collected for further processing; in this illustration in a second stage flash tank (details not shown).

The vapor stream 9 is processed in a diluent recycling facility. At least a portion of the vapor stream is condensed in a condenser 13 by heat exchange against a flow of heat exchange fluid 15. Condensed liquid diluent collects in an accumulator 17. Uncondensed diluent vapor is captured as a top stream 19, and flows to a compression plant (not shown).

Recovered liquid diluent stream 21 is collected from the accumulator and moved by pump 23 either to storage via spillover valve G or into the recycle diluent flow R through the diluent recycle valve D. In the embodiment illustrated in FIG. 1, the spillover valve G is controlled by a second flow controller 25, which receives a signal from a level controller F that stores a setpoint value for L, measures the actual value of L in the accumulator, and compares the setpoint value of L to the actual value of L to control the valve G. The valve G is controlled so that if the level L falls below the setpoint value stored, the valve G is controlled to close the valve. If the level L exceeds the setpoint, then the flow controller F will control the valve G to open.

The diluent recycle valve D is controlled by a third flow controller 27, which also reads the recycle diluent flow rate from the flow meter 1.

The flow controller C sets the position of the diluent feed valve B. A feed valve position optimizer E stores a pre-set desired feed valve position SP (generally from 0 (fully closed) to 10% open, typically from 1% or 2% open to 10% open), and also reads the actual position PV of the valve B and compares the values of SP and PV and signals the third flow controller 27 with a first stage recycle flow controller valve position for the diluent recycle valve D.

The pre-set desired valve position SP is typically determined from experience in running the reactor. The pre-set desired valve position SP can be 0% (fully closed), but is typically set at some value partially open, for instance because a fully closed valve D is subject to "sticking" closed and this can lead to problems in the reactor operation.

The position of the valve D is controlled by the flow controller C in a manner that, if in operation of the apparatus the position of the valve B is open less than the pre-set position, the valve D is closed and the valve B is opened to provide the minimum stored diluent flow S to provide the increased total diluent flow T, and if the position of the valve B is open more than the pre-set position, the valve D is opened and the valve B is closed to reduce the flow S to that required to provide the decreased total diluent flow T. (Although, as noted above, a fully closed valve position is typically undesirable and so a valve position PV>0 might be a criterion that is maintained.) If the position of the valve B is open equal to (within acceptable variance, typically from 2% to 10%, 2% to 5% or from 5% to 10%) the pre-set position, then the valves B and D are not moved.

An accumulator level override controller H stores a minimum value of L, and compares the actual level of L to this minimum value.

In the event that the level L falls below the minimum value of L the controller H overrides the signaling from the valve position optimizer by operation of a low override selector 29. If L is below the stored minimum value and the valve G is completely closed, the controller H overrides controller E to close the valve D and the valve B is opened by the controller C to provide the minimum stored diluent flow S to provide the desired total diluent flow T, compensating for the reduction in flow R through valve D.

FIG. 2 shows an alternative embodiment of the apparatus for implementing a method as disclosed herein. FIG. 2 illustrates a somewhat simplified embodiment, in which the separate flow controllers for the valves D and G are omitted and the valve D is controlled directly by the valve position optimizer E and the valve G is controlled directly by the level controller F. For clarity, the condenser portion of the diluent recycle facility and the pump used to move the recycled diluent illustrated in FIG. 1 are not shown in FIG. 2.

In FIG. 2, a flow controller C stores a value of a desired W%S or V%S and determines whether to maintain, increase or decrease the flow of diluent is into the polymerization reactor 3. The flow controller C performs the solids calculation of a total volume flow or mass flow (as might be required by the particular controllers used in the system) of liquid diluent T required to maintain the desired solids percentage.

The flow controller C also reads the amount r of the first stage recycle flow R from flow meter 1 through a diluent recycle valve D. The flow controller C also reads the amount of a diluent flows through a diluent feed valve B that controls a stored diluent flow S of diluent, and so also reads t, the amount of total diluent flow into the reactor T, as the sum r+s. The stored diluent may be fresh diluent or can be recycled diluent that has been accumulated from one or more flash tanks after condensation and collection as a liquid in an accumulator. The flow controller C also controls the diluent feed valve B to deliver the amount S, and so provide the amount T of diluent to the polymerization reactor 3 as the combined streams R and S.

A product stream 5, comprising the reaction slurry in turn comprising the diluent and the solids fraction that includes the polymer product and catalyst, is taken from the reactor to a slurry separation system for separating the polymer product from the diluent and recovering the diluent separately from the polymer product. In the embodiment illustrated in FIG. 2, the slurry separation system is a "two-stage flash system" and the product stream is introduced into a first stage flash tank 7. The first stage flash tank is operated under a condition that a substantial portion of the diluent is flashed and recovered as a vapor stream 9. A bottom stream 11, comprising the polymer product and other solids, now as a substantially more concentrated slurry, is collected for further processing; in this illustration in a second stage flash tank.

The vapor stream 9 is processed in a diluent recycling facility. At least a portion of the vapor stream is condensed and collected in an accumulator 17. Uncondensed diluent vapor is captured as a top stream 19 and sent to a compression plant (not shown).

Recovered liquid diluent stream 21 is collected from the accumulator and moved either to storage via spillover valve G or into the recycle diluent flow R through the diluent recycle valve D. In the embodiment illustrated in FIG. 2, the spillover valve G is controlled by a level controller F that stores a setpoint value for L, measures the actual value of L in the accumulator, and compares the setpoint value of L to the actual value of L to control the valve G. The valve G is controlled so that if the level L falls below the setpoint value stored, the valve G is incrementally closed, and if the level L rises above the setpoint value stored, the valve G is incrementally opened.

In the embodiment of FIG. 2, the diluent recycle valve D is controlled by the flow controller C, in a manner that signaling to the diluent recycle valve D can be overridden by an accumulator level override controller H as described below.

In the embodiment of FIG. 2, the flow controller C also sets the position of the diluent feed valve B. A feed valve position optimizer E stores a desired feed valve position SP (determined empirically as noted above, generally from 0 (fully closed) to 10% open, typically from 1% or 2% open to 10% open), and also reads the actual position PV of the valve B and compares the values of SP and PV and signals the diluent recycle valve D with a first stage recycle flow controller setpoint for valve position for the diluent recycle valve D. The pre-set desired valve position SP can be fully closed, but is typically set at some value partially open, for example because a fully closed valve D is subject to "sticking" closed and this can lead to problems in the operation of the reactor. The position of the valve D is controlled by the flow controller C in a manner that, if in operation of the apparatus the position of the valve B is open less than the pre-set position, the valve D is closed and the valve B is opened to provide the minimum stored diluent flow S (that is, the minimum flow additional to the amount that is provided when valve B is positioned at the pre-set position) to provide the total flow T to maintain the desired W%S or V%S, and if the position of the valve B is open more than the pre-set position, the valve D is opened and the valve B is closed to reduce the flow S to that required to provide the total diluent flow T to maintain the desired W%S or V%S. (Although, as noted above, a fully closed valve position is typically undesirable.) If the position of the valve B is open equal to (within acceptable variance) the pre-set position, then the valves B and D are not moved.

An accumulator level override controller H stores a minimum for the value of L, and compares the actual level of L to this minimum. In the event that the level L falls below the minimum value of L the controller H overrides the signaling from the valve position optimizer by operation of a low override selector 29. If L is below the stored minimum value and the valve G is completely closed, the controller H overrides controller E to close the valve D, and valve B will be opened by the controller C to provide the minimum stored diluent flow S to provide the desired total diluent flow T, compensating for the reduction in flow R through valve D.

If the level L exceeds the setpoint, then the controller F operates to open the valve D, and the valve B then closes toward a minimum opening. If the level L continues to be above the setpoint stored in F, then the controller F signals the valve G to open.

Figure 3:
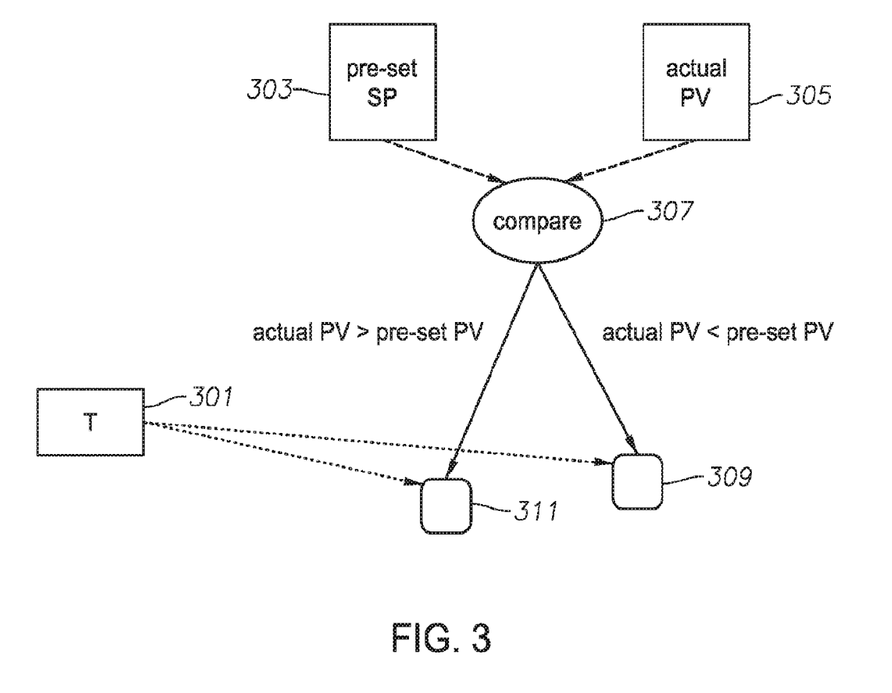
FIG. 3 is a flow diagram of a one embodiment of a process as disclosed herein.

FIG. 3 illustrates one embodiment of a method as disclosed herein, with reference to the FIG. 1. At 301 a total flow T of diluent into a polymerization reactor that is needed to maintain a desired W%S or V%S (as applicable to the controllers used) in the polymerization reactor is read. At 303 a preset desired position of the diluent feed valve B, SP, that is for example, an initial condition for starting the polymerization reactor or that has been estimated to provide an optimal reactor condition, is read. As explained above, SP is typically pre-determined empirically. At 305 the actual position of the diluent feed valve B, PV, is read. At 307 the values of SP and PV are compared. If the actual position of the diluent feed valve B is open less than the pre-set position, then at 309 the diluent recycle D is closed and the valve B is opened to provide the minimum stored diluent flow S to provide the flow T, and if the position of the diluent feed valve B is open more than the pre-set position, then at 311 the diluent recycle valve D is opened and the diluent feed valve B is closed to reduce the flow S to that required to provide the flow T.

Figure 4:
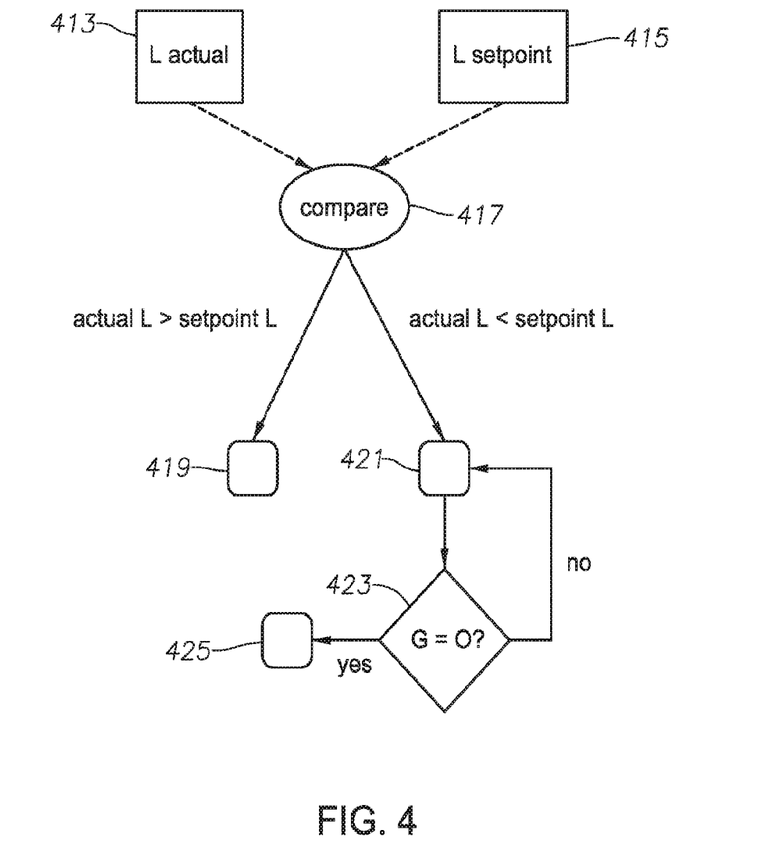
FIG. 4 is a flow diagram of a second embodiment of a process as disclosed herein.

FIG. 4 illustrates another embodiment of a method as disclosed herein, in which in addition to the control described in FIG. 3 above, the level of condensed diluent in an accumulator L also modulates the flows of diluent. The description of FIG. 4 following makes reference to the FIG. 1 as well.

At 413 the actual level of L in the accumulator is read. At 415 a setpoint level of L is read. At 417 the actual level of L is compared to setpoint level of L. If the actual level of L is greater than or equal to the setpoint level of L, then at 419 the position of the spillover valve G is maintained. If the actual level of L is less than the setpoint level of L, then at 421 the spillover valve G is closed. At 423, the position of the spillover valve G is compared to a completely closed position, and if the spillover valve G is not completely closed, then the valve G is (incrementally) closed until the actual level L reaches the preset level of L; and if the spillover valve G is completely closed, then at 425 the recycle flow valve D is closed and the diluent feed valve B is opened the minimum amount to provide the minimum flow S to provide the flow T.

Accordingly, there is presently disclosed a method for regulating stored diluent utilization by a polymerization reactor. Such a method can be one comprising:

i) determining a desired total amount of diluent flow into the polymerization reactor T;

ii) measuring a total diluent flow T into the polymerization reactor, T being the sum of a recycle diluent flow R and a flow S of stored diluent from a storage facility, the flow R being controlled by a recycle flow valve D and the flow S being controlled by a diluent feed valve B;

iii) reading the actual position of the valve B and comparing the actual valve position with a pre-set position of valve B, and controlling the valves D and B in a manner that, if the valve B is open less than the pre-set position, closing the valve D and opening the valve B to provide the minimum stored diluent flow S to provide the flow T, and if the valve B is open more than the pre-set position, opening the valve D and closing the valve B to reduce the flow S to that required to provide the flow T.

Such a method can include controlling the valves B and D in a manner that, if the actual position of the valve B (PV) is equal to the pre-set value of the position of valve B (SP) (within some acceptable variance, e.g. +/−1%, 2% or 5%), then the valves B and D are not moved.

Such a method can include controlling a valve G to regulate a spillover flow of liquid diluent from the first stage recycle accumulator to a storage facility. The spillover flow is regulated so as to keep the level of liquid diluent within a certain range, and especially above a minimum level L. If the level of liquid diluent in the first stage accumulator is too high, then the valve G opens. If the level of diluent in the first stage accumulator is too low, then the valve G closes.

Thus, the presently disclosed methods can include a further step iv) of controlling a valve G to regulate a spillover flow of liquid diluent from the first stage recycle accumulator to a storage facility in a manner that when the level of liquid diluent in the first stage accumulator falls below a setpoint value L, the valve G is closed. If a condition occurs that the valve G is completely closed and the level of liquid diluent in the first stage recycle accumulator is below L, then the valve D is closed and the valve B is opened the minimum amount to provide the minimum flow S to provide the flow T. In such an implementation, the level L of liquid diluent in the first stage recycle accumulator can be measured by a controller F that stores a setpoint value of L, and the valve G is controlled by the controller F.

The presently disclosed method can be one in which the desired flow T is set in or read by a first controller C, measuring the total flow of diluent into the reactor is by the controller C, the position of the valve B is controlled by the controller C, the position of the valve B is read by a second controller E, a pre-set value of the position of the valve B (SP) is set in the controller E, the actual position of the valve B (PV) is read by the controller E, the pre-set and actual positions of the valve B are compared by the controller E and the position of the valve D is controlled by the controller E.

Additionally or alternatively, under a condition that L is below a minimum value set in a controller H and the valve G is completely closed, such a method can be one in which control of the valve D by controller E is overridden by the controller H that stores a minimum value of L to close the valve D and open the valve B.

An implementation of the presently disclosed method can be one in which the level L of liquid diluent in the first stage recycle accumulator is measured by a controller F that stores a setpoint value of L, and the valve G is controlled by the controller F. Additionally or alternatively, under a condition that L is below a minimum value set in a controller H and the valve G is completely closed, such a method can be one in which control of the valve D by controller E is overridden by the controller H that stores a minimum value of L to close the valve D and open the valve B.

In any of the presently disclosed methods, the pre-set position of valve B can be from zero to 20 percent of fully open, for example from 0% or 1% or 2% of fully open to 20% of fully open, or from 0% or 1% or 2% of fully open to 15% of fully open. In any of the presently disclosed methods, the pre-set position of valve B can be fully closed (0% of fully open).

Also presently disclosed is an apparatus for regulating stored diluent utilization by a polymerization reactor system. Such an apparatus can comprise:

i) a polymerization reactor system including:
  i-1) a polymerization reactor configured for performing a polymerization reaction in a slung;
  i-2) a slurry separation system configured for separating polymer product from diluent the slurry and recovering polymer product separately from diluent;
  i-3) a diluent recycling facility that includes a recycle accumulator configured to accumulate diluent for recycling and to return accumulated diluent to the polymerization reactor as a recycle diluent flow R via a diluent recycle valve D, or to send accumulated diluent to a storage facility via a spillover valve G; and
  i-4) a facility for storing and delivering fresh diluent to the polymerization reactor via a stored diluent flow S through a diluent feed valve B;

ii) one or more controllers configured to, in operation, store a desired Weight % Solids (W%S) or Volume % Solids (V%S) in the polymerization reactor, to determine a flow of diluent into the polymerization reactor to maintain the desired W%S or V%S, to measure an actual total diluent flow T into the reactor, as a sum of the recycle diluent flow R and the stored diluent flow S, to store a pre-set position of the valve B, to read the actual position of the valve B, to compare the actual position of the valve B with the pre-set position, and to operate the valves B and D in a manner that, if in operation of the apparatus the position of the valve B is open less than the pre-set position, the valve D is closed and the valve B is opened to provide the minimum stored diluent flow S to provide the total diluent flow T necessary to maintain the desired W%S or V%S (as may be applicable), and if the position of the valve B is open more than the pre-set position, the valve D is opened and the valve B is closed to reduce the flow S to that required to provide the desired total diluent flow T to maintain the desired W%S or V%S (as may be applicable).

The one or more controllers can be further configured so that, if in operation the actual position of the valve B (PV) is equal to the pre-set value of the position of valve B (SP) (within some acceptable variance, e.g. +/−1%, 2% or 5%), then the valves B and D are not moved.

Such an apparatus can be one in which the one or more controllers are further configured to be responsive to the level L of liquid diluent that is accumulated in the recycle accumulator during operation of the system, to store a setpoint value of L, and to control the spillover valve G in a manner that, if in operation of the system the level L falls below the setpoint value stored, the valve G is controlled to close the valve.

Additionally or alternatively, such an apparatus can be one in which the one or more controllers are configured to be responsive to the level L of liquid diluent that is accumulated in the recycle accumulator in operation of the system, to store a minimum value of L, and configured so that, if in operation of the apparatus the level L falls below the minimum value stored, the diluent recycle valve D is controlled to close the valve.

Additionally or alternatively, such an apparatus can be one in which the one or more controllers include:
- a controller C that is configured to store or read the desired flow T, measure the actual total flow of diluent into the reactor T and control the position of the valve B;
- a controller E that is configured to store the pre-set position of the valve B, read the actual position of the valve B, compare the pre-set position of the valve B to the actual position of valve B in operation and to control the valve D.

Additionally or alternatively, such an apparatus can be one in which the one or more controllers further includes:
- iii) a controller F that is configured to store a setpoint value of L, measure the level L of diluent in the first stage accumulator, compare the level L of diluent in the first stage accumulator to the stored setpoint value of L and to control the valve G.

Additionally or alternatively, such an apparatus can be one in which the one or more controllers further includes:
- iii) (or iv)) a controller H that is configured to store a minimum value of L, to measure the level L of diluent in the first stage accumulator, compare the level L of diluent in the first stage accumulator to the stored minimum value of L and, under the condition that L is below the stored minimum value and the valve G is completely closed, to override controller E to control the valve D to close.

EXAMPLE

A worked embodiment of the disclosure is described below. This example is not to be considered limiting of the invention, which is defined by the appended claims.

In one illustrative embodiment, the desired flow T is one that establishes a desired density of solids in the reactor slurry. Weight percent solids is an algebraic solution given the overall slurry density (provided by a nuclear density meter, for example), the liquid phase density (determinable as known in the art), and the solids phase density (determinable as known in the art). The wt % of the solids in the slurry (as percentage of the total weight of the slurry) is calculated as:

$$\text{Weight\%Solids} = \frac{\rho_{POL} \times (\rho_{SL} - \rho_{LIQ})}{\rho_{SL} \times (\rho_{POL} - \rho_{LIQ})};$$

where $\rho_{POL}$ is the density of the solid polymer, $\rho_{SL}$ is the density of the slurry, $\rho_{LIQ}$ is the density of the liquid phase (diluent+monomer).

Figure 5:
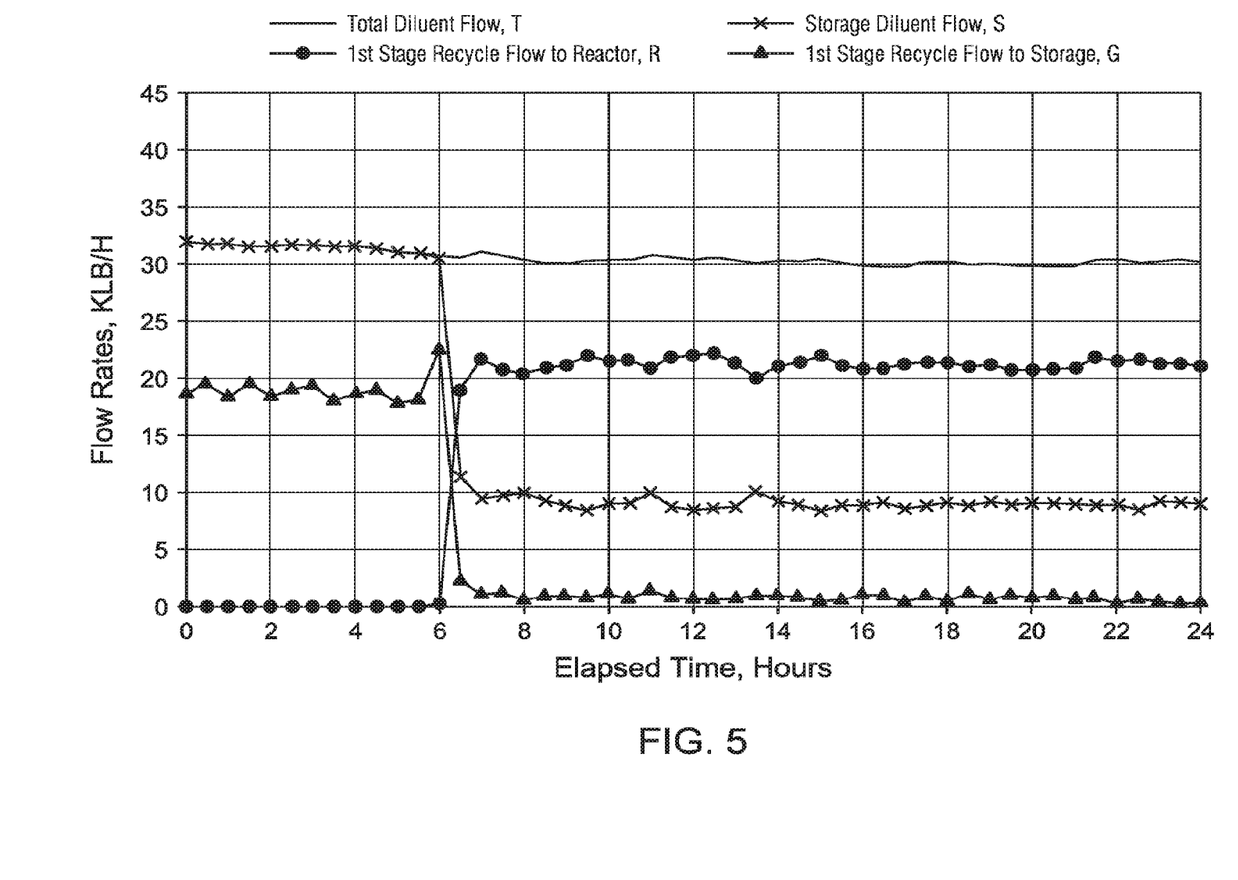
FIG. 5 is a graph showing rates of flows in various streams controlled by an embodiment of the system disclosed over time in a working example.
Figure 6:
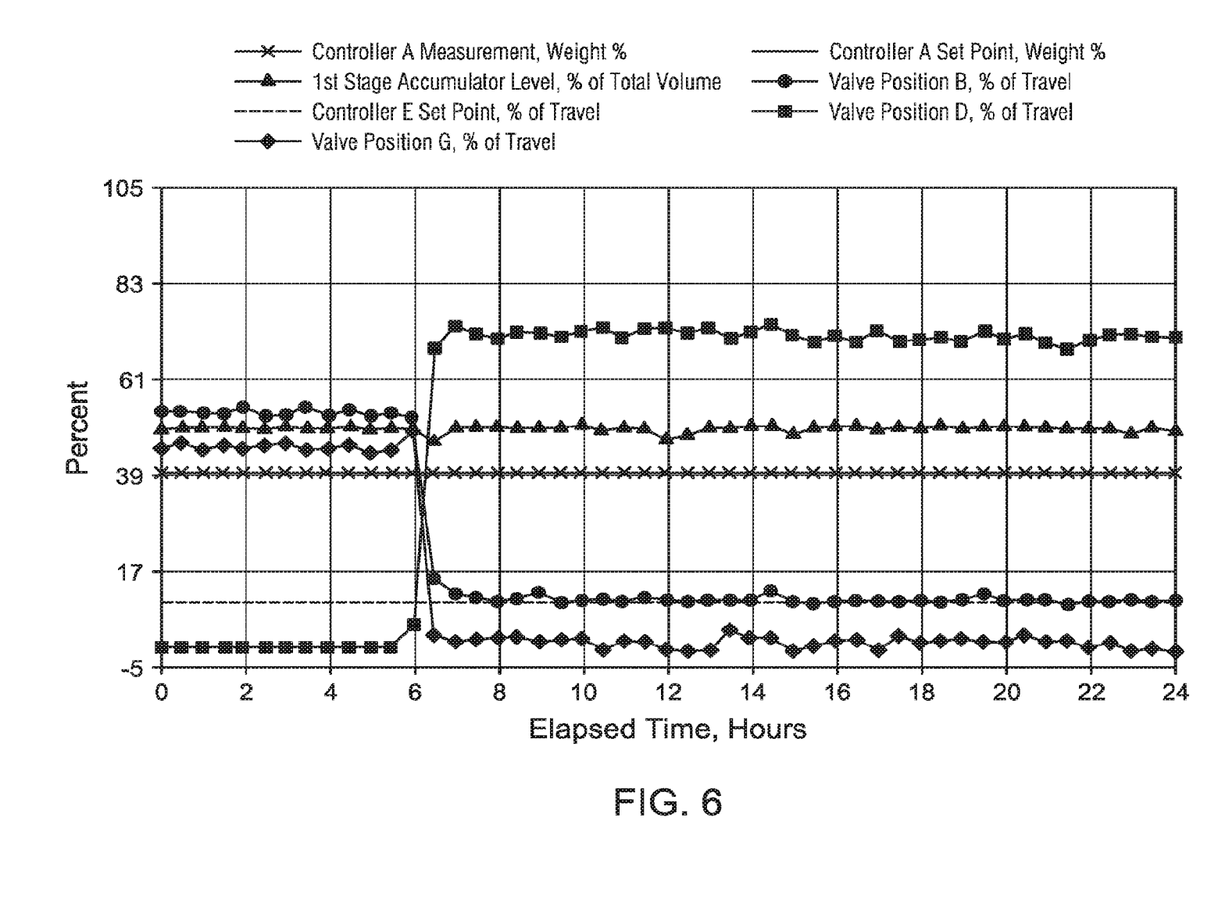
FIG. 6 is a graph showing changes in valve positions or controller setpoints or controller measurements over time in a working example.

A slurry-loop polymerization reactor having a two-stage diluent recovery system, as illustrated in FIG. 1, is charged with reactants and diluent, establishing an initial weight % solids (W%S) of 39.5 wt %. Controllers A and E are programmed on a Honeywell Experion Distributed Control System (DCS). Valves B, D and G are commercially available valves having electronic controls compatible with the DCS. The initial value for W%S 39.5 wt % is set as the setpoint in the controller A. The setpoint of valve B position (SP) is set in the controller E at 10% open, based upon operator experience with the reactor. Recycle flow valve D is initially closed. Spillover valve G is initially open to about 45% of travel, providing about 19 KLB/hr of processed diluent flow back to storage. At the start of operation, additional diluent to maintain 39.5 wt % solids is provided from diluent storage through the diluent feed valve B, initially controlled by controller C to about 54% of travel. The recycle flow to the reactor R is initially zero, and a flow rate of about 31 KLB/hr from diluent storage is provided through the valve B to maintain W%S at 39.5 wt %. At hour 6, the control system is turned on. The system opens the recycle flow valve D to increase first stage recycle flow R to 21-22 KLB/hr and valve G is closed to decrease the first stage recycle flow to storage G. At the same time, the diluent feed valve B is closed to the SP of 10% of travel, and the diluent flow from storage S is decreased to about 9-10 KLB/hr. The increased flow R allows the system to decrease storage diluent flow S while still meeting the demand for total diluent flow T of about 31 KLB/hr. The reactor solids proportion is maintained at the 39.5 wt % value set in the controller A during the transition. See FIG. 5 and FIG. 6.

Embodiments

Embodiment 1: A method for regulating stored diluent utilization by a polymerization reactor, comprising:
i) determining a desired total amount of diluent flow into the polymerization reactor T;
ii) measuring a total diluent flow T into the polymerization reactor, T being the sum of a recycle diluent flow R and a flow S of stored diluent from a storage facility, the flow R being controlled by a recycle flow valve D and the flow S being controlled by a diluent feed valve B;
iii) reading the actual position of the valve B and comparing the actual valve position with a pre-set position of valve B, and controlling the valves D and B in a manner that, if the valve B is open less than the pre-set position, closing the valve D and opening the valve B to provide the minimum stored diluent flow S to provide the flow T, and if the valve B is open more than the pre-set position, opening the valve D and closing the valve B to reduce the flow S to that required to provide the flow T.

Embodiment 2: The method of Embodiment 1, further comprising:
iv) controlling a valve G to regulate a spillover flow of liquid diluent from the first stage recycle accumulator to a storage facility in a manner that when the level of liquid diluent in the first stage accumulator falls below a setpoint value L, the valve G is closed.

Embodiment 3: The method of Embodiment 2, further comprising, if a condition occurs that the valve G is completely closed, closing the valve D; and opening the valve B the minimum amount to provide the minimum flow S to provide the flow T.

Embodiment 4: The method of any of Embodiments 1 to 3, in which the pre-set position of valve B is from zero to 20 percent of fully open.

Embodiment 5: The method of any of Embodiments 1 to 3, in which the pre-set position of valve B is fully closed.

Embodiment 6: The method of any of Embodiments 1 to 5, in which the desired flow T is set in or read by a first controller C, measuring the total flow of diluent into the reactor is by the controller C, the position of the valve B is controlled by the controller C, the position of the valve B is read by a second controller E, a pre-set value of the position of the valve B is set in the controller E, the actual position of the valve B is read by the controller E, the pre-set and actual positions of the valve B are compared by the controller E and the position of the valve D is controlled by the controller E.

Embodiment 7: The method of Embodiment 2, in which the level L of liquid diluent in the first stage recycle accumulator is measured by a controller F that stores a setpoint value of L, and the valve G is controlled by the controller F.

Embodiment 8: The method of Embodiment 5, in which the level L of liquid diluent in the first stage recycle accumulator is measured by a controller F that stores a setpoint value of L, and the valve G is controlled by the controller F.

Embodiment 9: The method of any one of Embodiments 6-8, in which control of the valve D by controller E is overridden by a controller H that stores a minimum value of L to close the valve D and open the valve B under a condition that L is below the minimum value set in the controller H and the valve G is completely closed.

Embodiment 10: An apparatus for regulating stored diluent utilization by a polymerization reactor system, comprising:
i) a polymerization reactor system including:
i-1) a polymerization reactor configured for performing a polymerization reaction in a slurry;
i-2) a slurry separation system configured for separating polymer product from diluent in the slurry and recovering polymer product separately from diluent;
i-3) a diluent recycling facility that includes a recycle accumulator configured to accumulate diluent for recycling and to return accumulated diluent to the polymerization reactor as a recycle diluent flow R via a diluent recycle valve D, or to send accumulated diluent to a storage facility via a spillover valve G; and
i-4) a facility for storing and delivering fresh diluent to the polymerization reactor via a stored diluent flow S through a diluent feed valve B;
ii) one or more controllers configured to, in operation, store a desired W%S or V%S (as may be applicable depending on the controllers used) in the polymerization reactor, to determine a flow of diluent into the polymerization reactor T to maintain the desired W%S or V%S, to measure an actual total diluent flow T into the reactor, as a sum of the recycle diluent flow R and the stored diluent flow S, to store a pre-set position of the valve B, to read the actual position of the valve B, to compare the actual position of the valve B with the pre-set position, and to operate the valves B and D in a manner that, if in operation of the apparatus the position of the valve B is open less than the pre-set position, the valve D is closed and the valve B is opened to provide the minimum stored diluent flow S to provide the total diluent flow T necessary to maintain the desired W%S or V%S (as may be applicable), and if the position of the valve B is open more than the pre-set position, the valve D is opened and the valve B is closed to reduce the flow S to that required to provide the desired total diluent flow T to maintain the desired W%S or V%S (as may be applicable).

Embodiment 11: The apparatus of Embodiment 10, in which the one or more controllers is further configured to be responsive to the level L of liquid diluent that is accumulated in the recycle accumulator during operation of the system, to store a setpoint value of L, and to control the spillover valve G in a manner that, if in operation of the system the level L falls below the setpoint value stored the valve G is controlled to close the valve.

Embodiment 12: The apparatus of Embodiment 10 or 11, in which the one or more controllers is configured to be responsive to the level L of liquid diluent that is accumulated in the recycle accumulator in operation of the system, to store a minimum value of L, and configured so that, if in operation of the apparatus the level L falls below the minimum value stored, the diluent recycle valve D is controlled to close the valve.

Embodiment 13: The apparatus of Embodiment 12, in which the one or more controllers include:
a controller C that is configured to store or read the desired flow T, measure the actual total flow of diluent into the reactor T and control the position of the valve B;
a controller E that is configured to store the pre-set position of the valve B, read the actual position of the valve B, compare the pre-set position of the valve B to the actual position of valve B in operation and to control the valve D.

Embodiment 14: The apparatus of Embodiment 12, in which the one or more controllers include:
iii) a controller F that is configured to store a minimum value of L, measure the level L of diluent in the first stage accumulator, compare the level L of diluent in the first stage accumulator to the stored setpoint value of L and to control the valve G.

Embodiment 15: The apparatus of any one of Embodiments 13 or 14, in which the one or more controllers further includes a controller H that is configured to store a minimum value of L, to measure the level L of diluent in the first stage accumulator, compare the level L of diluent in the first stage accumulator to the stored minimum value of L and, under the condition that L is below the stored minimum value and the valve G is completely closed, to override controller E to control the valve D to close.

What is claimed is:

1. A method for regulating stored diluent utilization by a polymerization reactor, comprising:
   i) determining a desired total amount of diluent flow into the polymerization reactor T;
   ii) measuring a total diluent flow T into the polymerization reactor, T being the sum of a recycle diluent flow R and a flow S of stored diluent from a storage facility, the flow R being controlled by a recycle flow valve D and the flow S being controlled by a diluent feed valve B;
   iii) reading the actual position of the valve B and comparing the actual valve position with a pre-set position of valve B, and controlling the valves D and B in a manner that, if the valve B is open less than the pre-set position, closing the valve D and opening the valve B to provide the minimum stored diluent flow S to provide the flow T, and if the valve B is open more than the pre-set position, opening the valve D and closing the valve B to reduce the flow S to that required to provide the flow T.

2. The method of claim 1, further comprising:
   iv) controlling a valve G to regulate a spillover flow of liquid diluent from a first stage recycle accumulator to a storage facility in a manner that when the level of liquid diluent in the first stage accumulator falls below a setpoint value L, the valve G is closed.

3. The method of claim 2, further comprising, if a condition occurs that the valve G is completely closed, closing the valve D; and opening the valve B the incremental amount to provide the minimum flow S to provide the flow T.

4. The method of claim 1, in which the pre-set position of valve B is from zero to 20 percent of fully open.

5. The method of claim 2, in which the pre-set position of valve B is fully closed.

6. The method of claim 2, in which the desired flow T is set in or read by a first controller C, measuring the total flow of diluent into the reactor is by the controller C, the position of the valve B is controlled by the controller C, the position of the valve B is read by a second controller E, a pre-set value of the position of the valve B is set in the controller E, the actual position of the valve B is read by the controller E, the pre-set and actual positions of the valve B are compared by the controller E and the position of the valve D is controlled by the controller E.

7. The method of claim 2, in which the level L of liquid diluent in the first stage recycle accumulator is measured by a controller F that stores a setpoint value of L, and the valve G is controlled by the controller F.

8. The method of claim 5, in which the level L of liquid diluent in the first stage recycle accumulator is measured by a controller F that stores a setpoint value of L, and the valve G is controlled by the controller F.

9. The method of claim 6, in which control of the valve D by controller E is overridden by a controller H that stores a minimum value of L to close the valve D and open the valve B under a condition that L is below the minimum value set in the controller H and the valve G is completely closed.

10. The method of claim 7, in which if L is below the minimum value stored in a controller H and the valve D is completely closed, control of the valve D by controller E is overridden by the controller H to close the valve D and the valve B is opened by the controller C to provide the minimum stored diluent flow S to compensate for the reduction in flow R through valve D to maintain the desired total diluent flow T.

11. The method of claim 8, in which if L is below the minimum value stored in a controller H and the valve D is completely closed, control of the valve D by controller E is overridden by the controller H to close the valve D and the valve B is opened by the controller C to provide the minimum stored diluent flow S to compensate for the reduction in flow R through valve D to maintain the desired total diluent flow T.

12. An apparatus for regulating stored diluent utilization by a polymerization reactor system, comprising:
i) a polymerization reactor system including:
i-1) a polymerization reactor configured for performing a polymerization reaction in a slurry;
i-2) a slurry separation system configured for separating polymer product from diluent in the slurry and recovering polymer product separately from diluent;
i-3) a diluent recycling facility that includes a recycle accumulator configured to accumulate diluent for recycling and to return accumulated diluent to the polymerization reactor as a recycle diluent flow R via a diluent recycle valve D, or to send accumulated diluent to a storage facility via a spillover valve G; and
i-4) a facility for storing and delivering fresh diluent to the polymerization reactor via a stored diluent flow S through a diluent feed valve B;
ii) one or more controllers configured to, in operation, store a desired Weight % Solids (W%S) or Volume % Solids (V%S) in the polymerization reactor, to determine a flow of diluent into the polymerization reactor T to maintain the desired W%S or V%S, to measure an actual total diluent flow T into the reactor, as a sum of the recycle diluent flow R and the stored diluent flow S, to store a pre-set position of the valve B, to read the actual position of the valve B, to compare the actual position of the valve B with the pre-set position, and to operate the valves B and D in a manner that, if in operation of the apparatus the position of the valve B is open less than the pre-set position, the valve D is closed and the valve B is opened to provide the minimum stored diluent flow S to provide the total diluent flow T necessary to maintain the desired W%S or V%S, and if the position of the valve B is open more than the pre-set position, the valve D is opened and the valve B is closed to reduce the flow S to that required to provide the desired total diluent flow T to maintain the desired W%S or V%S.

13. The apparatus of claim 12, in which the one or more controllers is further configured to be responsive to the level L of liquid diluent that is accumulated in the recycle accumulator during operation of the system, to store a setpoint value of L, and to control the spillover valve G in a manner that, if in operation of the system the level L falls below the setpoint value stored the valve G is controlled to incrementally close the valve.

14. The apparatus of claim 12, in which the one or more controllers is configured to be responsive to the level L of liquid diluent that is accumulated in the recycle accumulator in operation of the system, to store a minimum value of L, and configured so that, if in operation of the apparatus the level L falls below the minimum value stored, the diluent recycle valve D is controlled to close the valve.

15. The apparatus of claim 13, in which the one or more controllers is configured to be responsive to the level L of liquid diluent that is accumulated in the recycle accumulator in operation of the system, to store a minimum value of L, and configured so that, if in operation of the apparatus the level L falls below the minimum value stored, the diluent recycle valve D is controlled to close the valve.

16. The apparatus of claim 13, in which the one or more controllers include:
a controller C that is configured to store or read the desired flow T, measure the actual total flow of diluent into the reactor T and control the position of the valve B;
a controller E that is configured to store the pre-set position of the valve B, read the actual position of the valve B, compare the pre-set position of the valve B to the actual position of valve B in operation and to control the valve D.

17. The apparatus of claim 15, in which the one or more controllers further includes:
iii) a controller F that is configured to store a setpoint value of L, measure the level L of diluent in the first stage accumulator, compare the level L of diluent in the first stage accumulator to the stored setpoint value of L and to control the valve G.

18. The apparatus of claim 16, in which the one or more controllers further includes:
iii) a controller H that is configured to store a minimum value of L, to measure the level L of diluent in the first stage accumulator, compare the level L of diluent in the first stage accumulator to the stored minimum value of L and, under the condition that L is below the stored minimum value and the valve G is completely closed, to override controller E to control the valve D to close.

19. The apparatus of claim 17, in which the one or more controllers further includes:
  iv) a controller H that is configured to store a minimum value of L, to measure the level L of diluent in the first stage accumulator, compare the level L of diluent in the first stage accumulator to the stored minimum value of L and, under the condition that L is below the stored minimum value and the valve G is completely closed, to override controller E to control the valve D to close.

* * * * *